United States Patent
Zerbato et al.

(10) Patent No.: US 8,701,523 B2
(45) Date of Patent: Apr. 22, 2014

(54) COUPLING DEVICE FOR A HYBRID POWER TRAIN THAT OPERATES IN AT LEAST TWO, ELECTRICAL/COMBUSTION-ELECTRICAL MODES, INTENDED FOR A VEHICLE

(75) Inventors: Thierry Zerbato, Aiguillon (FR); Pascal Duclos, Gontaud de Nogaret (FR)

(73) Assignee: Polaris Sales Europe SARL, Rolle (CH)

( * ) Notice: Subject to any disclaimer, the term of this patent is extended or adjusted under 35 U.S.C. 154(b) by 359 days.

(21) Appl. No.: 13/058,396

(22) PCT Filed: Oct. 24, 2008

(86) PCT No.: PCT/FR2008/051924
§ 371 (c)(1),
(2), (4) Date: Feb. 10, 2011

(87) PCT Pub. No.: WO2009/056747
PCT Pub. Date: May 7, 2009

(65) Prior Publication Data
US 2011/0190084 A1 Aug. 4, 2011

(30) Foreign Application Priority Data
Oct. 24, 2007 (FR) ...................................... 07 58538

(51) Int. Cl.
*F16H 37/06* (2006.01)
(52) U.S. Cl.
USPC .......................................... 74/661; 74/665 A
(58) Field of Classification Search
USPC ..... 74/661, 664, 665 R, 665 A, 665 B, 665 C
See application file for complete search history.

(56) References Cited

U.S. PATENT DOCUMENTS

| | | | | |
|---|---|---|---|---|
| 7,121,164 B2* | 10/2006 | Hanyu et al. | ..................... | 74/661 |
| 2003/0217617 A1* | 11/2003 | Sakamoto et al. | .......... | 74/665 B |
| 2004/0124021 A1* | 7/2004 | Shirai et al. | .................. | 180/65.2 |
| 2004/0159183 A1* | 8/2004 | Sakamoto et al. | .............. | 74/661 |
| 2005/0139035 A1* | 6/2005 | Lee et al. | ......................... | 74/661 |

FOREIGN PATENT DOCUMENTS

| | | |
|---|---|---|
| EP | 1232891 A1 | 8/2002 |
| FR | 2798328 A1 | 3/2001 |

OTHER PUBLICATIONS

International Search Report, dated May 14, 2009, from corresponding PCT application.

* cited by examiner

*Primary Examiner* — Troy Chambers
*Assistant Examiner* — Jake Cook
(74) *Attorney, Agent, or Firm* — Faegre Baker Daniels LLP

(57) ABSTRACT

A coupling device for a hybrid power plant operates in at least two electrical/internal-combustion-electrical modes designed for a vehicle, whereby the coupling device includes a first drive shaft that is coupled to an electric motor and a second drive shaft that is coupled to an internal combustion engine. The coupling device includes at least one primary shaft that can be coupled by first or second transmission element to the first or the second drive shaft under the action of selection element that can assume a first position and a second position in such a way that: In the first position of the selection element, the primary shaft is coupled to the first or to the second drive shaft by the first or the second transmission element; and In the second position of the selection element, the primary shaft is coupled to the first drive shaft by the first transmission element.

16 Claims, 3 Drawing Sheets

Figure 1:
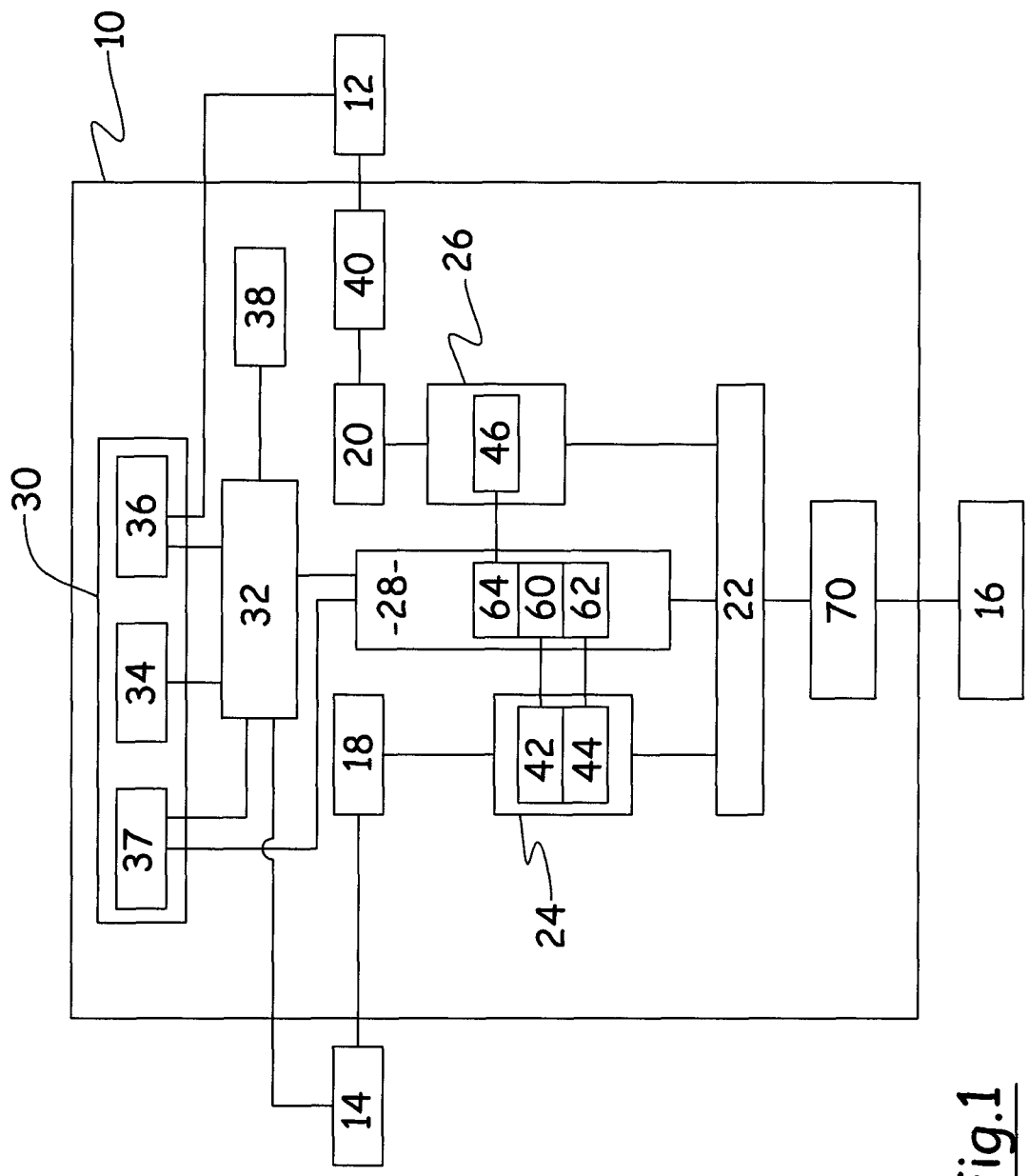

COUPLING DEVICE FOR A HYBRID POWER TRAIN THAT OPERATES IN AT LEAST TWO, ELECTRICAL/COMBUSTION-ELECTRICAL MODES, INTENDED FOR A VEHICLE

This invention relates to a coupling device for a hybrid power plant operating in at least two electrical/internal-combustion-electrical modes designed for a vehicle, in particular for a light utility vehicle.

In urban or industrial use, an electric utility vehicle provides several advantages.

Thus, in the urban and peri-urban zone, the electric utility vehicle effectively contributes to reducing the air pollution produced by the exhaust from increasingly numerous combustion-engine vehicles.

Next, the noise pollution that results from highway noise, such as trash collection, road-cleaning, and maintenance of grassy areas, for example, is considered to be very bothersome during the day, in particular because of the times when said maintenance vehicles are in operation.

The electric utility vehicle does not produce any noise pollution, which is very important for the residents of mid-sized and large cities.

Compared to an internal-combustion-engine utility vehicle, the electric utility vehicle is better-performing in the case of short repetitive trips such as the urban applications cited above, various pick-ups, spraying, and the delivery of merchandise, as well as certain maintenance or logistical kinds of industrial applications.

Actually, with an internal-combustion-engine utility vehicle used as in "stop-and-go" mode, i.e., on short trips interspersed with extended stops, the engine never reaches the ideal temperature to operate normally.

In greater detail, an increased consumption of 50 to 80% is observed for the $1^{st}$ kilometer, and an increased consumption of 25 to 50% is observed for the $2^{nd}$ kilometer, and, finally, starting from the $6^{th}$ kilometer, the consumption becomes almost normal.

The electric utility vehicle is presented as a much better solution that is suitable for a "stop-and-go" use because it does not consume energy when stopped, has a yield of greater than 90% regardless of the engine speed, and it generally includes electric braking with energy recovery that conserves the brakes.

Therefore, on short, often congested, urban trips, and so as to facilitate the frequent stops and repetitive maneuvers, most of the cities are equipped with light utility vehicles with electric motors.

However, internal-combustion-engine vehicles are still used for longer trips because of the longer range of internal combustion engines.

In the case of mixed-use, i.e., in which the utility vehicle is to be used on short trips that are interspersed with extended stops, but also on longer trips of several kilometers, such as, for example, for going to the dump site after a pick-up or for connecting various grassy areas of the city via the main roads, it becomes difficult to make a choice between an internal combustion engine and an electric motor.

One object of this invention is to enable the production of a vehicle, and more particularly a light utility vehicle, combining the advantages of an electric motor on short interspersed trips and those of an internal combustion engine on long trips.

For this purpose, the invention has as its object a coupling device for a hybrid power plant operating in at least two electrical/internal-combustion-electrical modes that are designed for a vehicle, in particular a light utility vehicle, whereby said hybrid power plant comprises at least one internal combustion engine and at least one electric motor; said coupling device comprises a first drive shaft that is coupled to the electric motor, a second drive shaft that is coupled to the internal combustion engine, and at least one primary shaft that drives at least one wheel of the vehicle and is able to be coupled by first or second transmission means to the first or second drive shaft under the action of selection means that can assume a first and a second position, in such a way that:

In the first position of the selection means, the primary shaft is coupled to the first or to the second drive shaft by the first or the second transmission means, and In the second position of the selection means, the primary shaft is coupled to the first drive shaft by the first transmission means.

More specifically, this invention has been developed so as to enable the production of a utility vehicle of small dimensions and an electric motor with use of an internal combustion engine over long trips.

In this manner, using the coupling device according to the invention, it becomes possible to improve the autonomy capacities of the existing light utility vehicles with electric motors.

Figure 2:
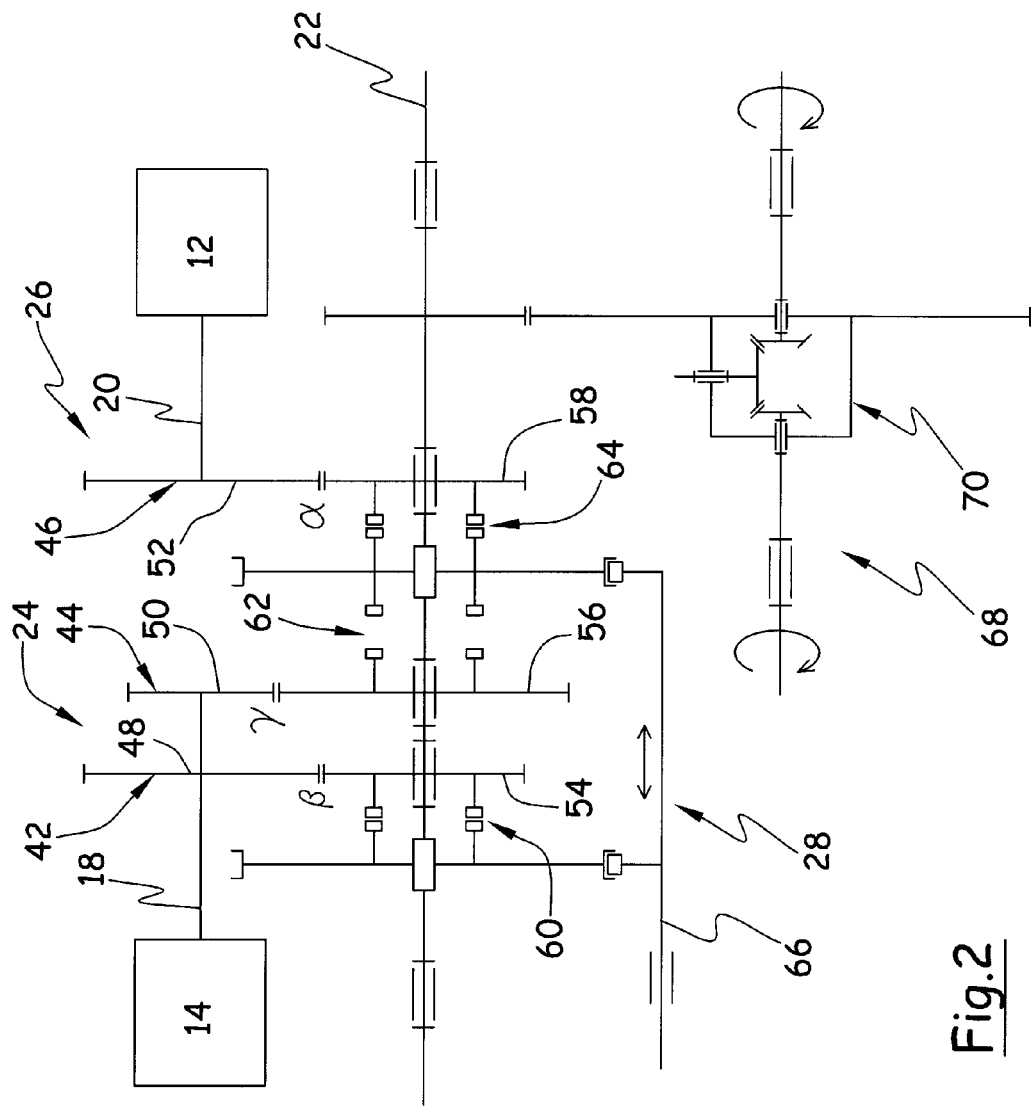
Figure 3:
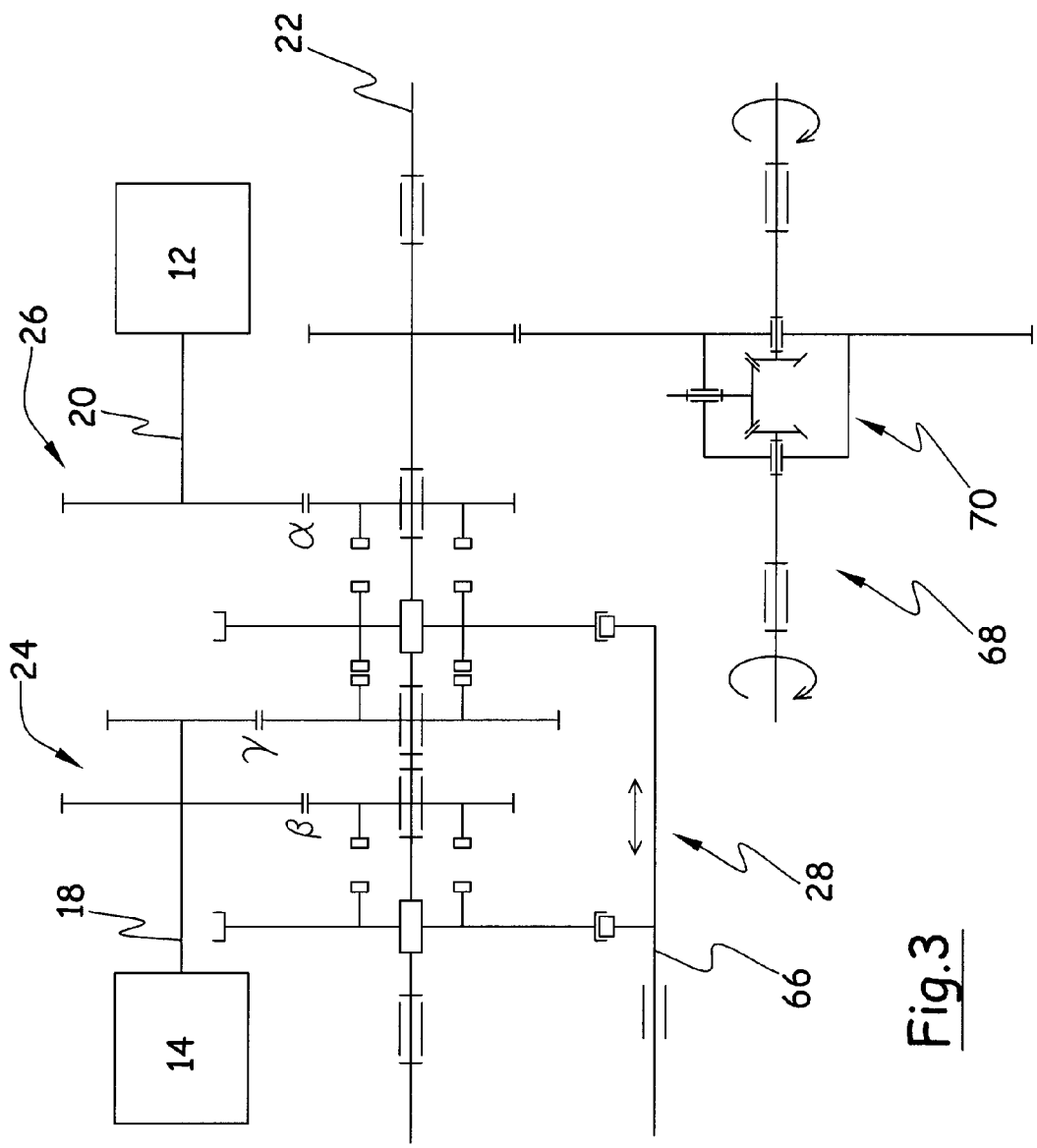

Other characteristics and advantages will emerge from the following description of the invention, a description that is provided only by way of example, relative to the accompanying drawings in which:

FIG. 1 is a representation in the form of a diagram of an embodiment of a coupling device according to the invention, FIG. 2 is a schematic representation of a coupling device according to the invention in the first position of the selection means, FIG. 3 is a schematic representation of a coupling device according to the invention in the second position of the selection means.

The diagram of FIG. 1 shows the structure and the relationships between the different elements of a hybrid power plant of a vehicle that is equipped with a coupling device 10 according to the invention for an operation in at least two modes: an electrical operating mode and an electrical/internal-combustion operating mode, whereby a degraded electrical/internal-combustion operating mode can make possible an additional internal-combustion operating mode.

With said hybrid power plant comprising at least one internal combustion engine 12 and at least one electric motor 14, said coupling device 10 makes it possible to manage the driving of at least one wheel 16 of a vehicle starting from said electric motor 14 and said internal combustion engine 12.

For this purpose, said coupling device 10 comprises a first drive shaft 18 that is coupled to the electric motor 14, a second drive shaft 20 that is coupled to the internal combustion engine 12, and at least one primary shaft 22 that drives at least one wheel 16 of said vehicle.

Said primary shaft 22 is able to be coupled by the first or the second transmission means (24, 26) to the first or the second drive shaft (18, 20).

So as to actuate or to release the coupling of each of said first and second transmission means (24, 26) with the primary shaft 22, the coupling device 10 comprises selection means 28 that can assume a first and a second position in such a way that:

In the first position of the selection means, the primary shaft 22 is coupled to the first or the second drive shaft (18, 20) by the first or the second transmission means (24, 26), and In the second position of the selection means, the primary shaft 22 is coupled to the first drive shaft 18 by the first transmission means 24.

Thus, owing to its selection means 28, the coupling device 10 according to the invention makes it possible to manage the distribution between the movements transmitted by the first and second drive shafts (18, 20).

More specifically, in the first position of the selection means 28, at least one wheel 16 is able to be driven by the internal combustion engine 12 and the electric motor 14, and, in the second position of the selection means 28, said wheel 16 is able to be driven by the electric motor 14 by itself.

The coupling device 10 thus promotes management of a hybrid power plant by allowing an operation in electrical mode in which only the electric motor 14 is used, as well as an operation in internal-combustion-electrical mode in which the internal combustion engine 12 is assisted by an electric motor 14.

The device according to the invention comprises guide means 30 that can be activated by the driver and control means 32 that are suitable for at least monitoring the position of the selection means 28 and the operation of the internal combustion engine 12 and the electric motor 14 based on different parameters relative to the operation of said engine and said motor, and actions of the driver on said guide means 30.

In one embodiment that is illustrated in FIG. 1, the guide means 30 comprise at least one selection device in the direction of travel 34, such as a switch with two advance and retraction positions, for example, at least one acceleration/braking device 36 of the vehicle, in particular a pedal, and at least one device 37 for selecting the electrical or internal-combustion-electrical operating mode.

The device for selecting the direction of travel 34 is connected to the control means 32 so as to transmit thereto the command for the direction of travel selected.

The acceleration/braking device 36 controls the operation of the electric motor and/or the internal combustion engine 12 directly or by means of the control means 32.

The selection device 37 controls the position of the selection means 28 directly or by means of the control means 32.

The control means 32, their programming and the different inputs/outputs that they can manage are not presented in more detail because they depend on the use that is made of the vehicle, and, moreover, the implementation and the selection of the input/output parameters of said control means 32 are part of the knowledge of one skilled in the art.

However, one example of a process for managing a hybrid power plant that is equipped with a coupling device according to the invention is provided at the end of this description.

The coupling device 10 for a hybrid power plant obviously comprises electrical energy supply means 38. These supply means 38 are connected to the control means 32 so as to make it possible for said control means 32 to manage the distribution of energy between the different components of the coupling device 10 and the electric motor 14.

In one embodiment of the invention, the coupling device 10 comprises means for disconnecting the internal combustion engine 12 with the second drive shaft 20.

These disconnecting means make it possible to drive the primary shaft 22 with only the electric motor 14 whereas the selection means 28 are found in their first position, a first position in which said primary shaft is coupled to the first or to the second drive shaft (18, 20) by the first or the second transmission means (24, 26).

These disconnecting means thus make it possible to reverse the direction of rotation of the electric motor 14 relative to the direction of rotation of the internal combustion engine 12, in particular for going into reverse, in the first position of the selection means 28.

In a preferred embodiment of the invention, the internal combustion engine 12 is coupled to the second drive shaft 20 by means of a continuous variable transmission device 40, whereby this continuous variable transmission device 40 is known for adapting by inertia the reduction based on engine speed.

Advantageously, said continuous variable transmission device 40 also makes it possible to implement the disconnection between the internal combustion engine 12 and the second drive shaft 20.

Still in a preferred embodiment of the invention, the first transmission means 24 have a transmission ratio that is different for each of the two positions of the selection means 28.

In this manner, the transmission ratio is adapted depending on whether the electric motor 14 is used by itself or with the internal combustion engine 12.

In a more detailed manner, the first transmission means 24 comprise at least one first transmission device 42 of transmission ratio 13 in the first position of the selection means 28 and at least one second transmission device 44 of transmission ratio $\gamma$ in the second position of the selection means 28, and the second transmission means 26 comprise at least one third transmission device 46 of transmission ratio $\alpha$ in the first position of the selection means 28.

In addition, each of the ratios $\alpha$, $\beta$, and $\gamma$ is suitable for obtaining an operation of the motor(s) on its (their) optimal range(s) of operation, in particular close to its (their) nominal point(s) of operation, for each of the two positions of the selection means 28.

As FIGS. 2 and 3 illustrate diagrammatically, the first, second and third transmission devices (42, 44, 46) preferably come in the form of gear connections, whereby at least one first gearwheel (48, 50, 52) is integral in rotation with the corresponding drive shaft (18, 20) and at least one second gearwheel (54, 56, 58) is able to be made integral in rotation with the primary shaft 22.

So as to activate or to release the coupling of each of said first, second and third transmission devices (42, 44, 46) with the primary shaft 22, said selection means 28 comprise:
  At least one first coupling device 60 of the primary shaft 22 with the first transmission device 42 of transmission ratio 13 in the first position of the selection means 28,
  At least one second coupling device 62 of the primary shaft 22 with the second transmission device 44 of transmission ratio $\gamma$ in the second position of the selection means 28,
  At least one third coupling device 64 of the primary shaft 22 with the third transmission device 46 of transmission ratio $\alpha$ in the first position of the selection means 28.

In one preferred embodiment of the invention, the first, second and third coupling devices (60, 62, 64) are integral in rotation with the primary shaft 22, free in translation in a direction that is essentially parallel to the axis of said primary shaft 22, and they make it possible to implement a mechanical coupling, in particular by gears, between said primary shaft 22 and the corresponding transmission device (42, 44, 46). In addition, the selection means 28 comprise translational displacement means 66 of said first, second and third coupling devices (60, 62, 64).

In this manner, during the change in position of the selection means 28 commanded by the control means 32 or directly by the selection device 37 of the coupling device according to the invention, the translational displacement means 66 make it possible to engage/disengage, or to clutch/declutch, said mechanical coupling between the primary shaft 22 and said transmission devices (42, 44, 46).

Still in a preferred embodiment of the coupling device 10 for a hybrid power plant and in the case where said power plant drives at least one set of wheels 68 that consists of at least two wheels 16 that are parallel and not aligned in the direction of advance of the vehicle, the coupling device 10 for a hybrid power plant comprises a differential 70 between the primary shaft 22 and the two wheels of said set of wheels 68.

The coupling device 10 according to the invention therefore proposes a relatively simple design, which may make it possible to implement a coupling between an internal combustion engine and an electric motor in a minimal space requirement. This characteristic proves to be very advantageous, and even necessary, for an application of the invention to light utility vehicles.

In contrast, a simplified design also leads to reduced manufacturing costs, which cannot be considered to be negligible.

One example of a process for management of a hybrid power plant that implements a coupling device according to the invention will now be described. It is a matter of a non-limiting example as much for the application as for the stages of said process.

Thus, in the case of a light utility vehicle that is designed to make short interspersed trips as well as longer trips over faster routes, two primary operating modes of said power plant will be able to be used: the electrical mode and the internal-combustion-electrical mode.

A particular use of the vehicle that is equipped with the coupling device according to the invention corresponds to each of these operating modes.

During use of said vehicle, the driver is to select, upon stopping, the operating mode, either an electrical operating mode or an internal-combustion-electrical operating mode.

For urban use on trips that are short and that are interspersed with extended stops, the driver will give preference to the electrical mode of said hybrid power plant.

For this purpose, the control means 32 or the selection device 37 arrange(s) for the selection means 28 to be placed in their second position in such a way that the primary shaft 22 is coupled by the first transmission means 24 to the first drive shaft 18 that is coupled to the electric motor 14, and said control means 32 manage the rotation of said electric motor in a first direction corresponding to the direction of advance of the vehicle and a speed that depends on the action of the driver on the acceleration/braking device 36. In urban and extra-urban use on longer trips, the driver will give preference to the internal-combustion-electrical mode.

For this purpose, the control means 32 or the selection device 37 arrange(s) for the selection means 28 to be placed in their first position in such a way that the primary shaft 22 is coupled to the first or to the second drive shaft (18, 20) by the first or the second transmission means (24, 26), and the control means 32 and/or the acceleration/braking device 36 manage(s) the rotation of said electric motor 14 and internal combustion engine 12.

During use in so-called degraded internal-combustion-electrical mode of the coupling device according to the invention, only the internal combustion engine 12 is used for driving the primary shaft 22. The electric motor is always coupled to said primary shaft 22, but it is not supplied with electrical energy by the control means 32.

Finally, whether this is in use in an electrical or internal-combustion-electrical mode, during braking or release of the acceleration/braking device 36, the management process provides for using the electric motor 14 as a generator, whereby the control means 32 send the thus produced electrical energy to the energy supply means 38.

When the driver decides to put the vehicle in reverse, he activates the device 34 for selecting the direction of travel independently of the electrical or internal-combustion-electrical selected mode.

The change in state of the selection device 34 leads the control means 32 to reverse the direction of rotation of the electric motor 14 relative to the direction of rotation of the internal combustion engine 12.

Said reverse operation is still performed using the drive of the electric motor 14, independently of the electrical or internal-combustion-electrical operating mode that is selected with the selection device 37, using disconnecting means between the internal combustion engine 12 and the second drive shaft 20.

In a preferred embodiment of the invention, during a reverse operation in the internal-combustion-electrical mode, the continuous variable transmission device 40 makes it possible to disconnect the internal combustion engine 12 from the second drive shaft 20 so that the primary shaft 22 is driven only by the electric motor 14.

The invention claimed is:

1. A coupling device for a hybrid power plant of a vehicle having at least one wheel, the hybrid power plant operating in at least two electrical/internal-combustion-electrical and including at least one internal combustion engine and at least one electric motor, said coupling device comprising:
   a first drive shaft coupled to the electric motor, and a second drive shaft coupled to the internal combustion engine;
   at least one primary shaft configured to drive the at least one wheel of the vehicle, the primary shaft being selectively coupled by a first transmission and a second transmission to the first and second drive shafts, respectively, under the action of a mode selector having a first position and a second position, in such a way that:
   in the first position of the mode selector, the primary shaft is coupled to both the first drive shaft and the second drive shaft by first and second independent gear sets of the first transmission and the second transmission, respectively, and
   in the second position of the mode selector, the primary shaft is coupled to the first drive shaft by the first transmission and uncoupled from the second drive shaft by the second transmission so that the at least one electric motor drives the primary shaft by itself without assistance from the internal combustion engine.

2. The coupling device according to claim 1, wherein the first transmission has a transmission ratio that is different for each of the two positions of the mode selector.

3. The coupling device according to claim 1, wherein the first transmission comprises at least one first transmission device of transmission ratio $\beta$ in the first position of the mode selector and at least one second transmission device of transmission ratio $\gamma$ in the second position of the mode selector, and the second transmission comprise at least one third transmission device of transmission ratio $\alpha$ in the first position of the mode selector, and wherein each of the ratios $\alpha$, $\beta$, and $\gamma$ is suitable for obtaining an operation of the motor(s) on its (their) range(s) of optimal operation for each of the two positions of the mode selector.

4. The coupling device according to claim 3, wherein said mode selector comprises:
   at least one first coupling device for coupling the primary shaft with the first transmission device of transmission ratio $\beta$ in the first position of the mode selector, at least one second coupling device for coupling the primary shaft with the second transmission device of transmission ratio γ in the second position of the mode selector, at least one third coupling device for coupling the primary shaft with the third transmission device of transmission ratio α in the first position of the mode selector.

5. The coupling device according to claim 4, wherein the first, second and third coupling devices are integral in rotation with the primary shaft, free in translation in a direction that is essentially parallel to the axis of said primary shaft, and make it possible to implement a mechanical coupling, in particular by gears, between said primary shaft and the corresponding transmission device, and wherein the mode selector comprise translational displacement means of said first, second and third coupling devices.

6. The coupling device according to claim 1, wherein said coupling device comprises a differential between the primary shaft and at least two wheels.

7. The coupling device according to claim 1, further comprising means for disconnecting from the internal combustion engine with the second drive shaft so as to make it possible to reverse the direction of rotation of the electric motor relative to the direction of rotation of the internal combustion engine, in particular for implementing a reverse operation, in the first position of the mode selector.

8. The coupling device according claim 1, wherein the internal combustion engine is coupled to the second drive shaft by means of a continuous variable transmission device.

9. The coupling device according to claim 2, wherein the first transmission comprise at least one first transmission device of transmission ratio β in the first position of the mode selector and at least one second transmission device of transmission ratio γ in the second position of the mode selector, and the second transmission comprise at least one third transmission device of transmission ratio α in the first position of the mode selector, and wherein each of the ratios α, β, and γ is suitable for obtaining an operation of the motor on its range of optimal operation for each of the two positions of the mode selector.

10. The coupling device according to claim 2, wherein said coupling device comprises a differential between the primary shaft and at least two wheels.

11. The coupling device according to claim 3, wherein said coupling device comprises a differential between the primary shaft and at least two wheels.

12. The coupling device according to claim 4, wherein said coupling device comprises a differential between the primary shaft and at least two wheels.

13. The coupling device according to claim 5, wherein said coupling device comprises a differential between the primary shaft and at least two wheels.

14. The coupling device according to claim 2, further comprising means for disconnecting from the internal combustion engine with the second drive shaft so as to make it possible to reverse the direction of rotation of the electric motor relative to the direction of rotation of the internal combustion engine, in particular for implementing a reverse operation, in the first position of the mode selector.

15. The coupling device according to claim 3, further comprising means for disconnecting from the internal combustion engine with the second drive shaft so as to make it possible to reverse the direction of rotation of the electric motor relative to the direction of rotation of the internal combustion engine, in particular for implementing a reverse operation, in the first position of the mode selector.

16. The coupling device according to claim 1, wherein in the second position of the mode selector, the primary shaft is coupled to the first drive shaft by a third independent gear set of the first transmission separate from the first and second independent gear sets.

* * * * *